(12) United States Patent
Kancherla et al.

(10) Patent No.: US 11,296,984 B2
(45) Date of Patent: Apr. 5, 2022

(54) USE OF HYPERVISOR FOR ACTIVE-ACTIVE STATEFUL NETWORK SERVICE CLUSTER

(71) Applicant: Nicira, Inc., Palo Alto, CA (US)

(72) Inventors: Mani Kancherla, Cupertino, CA (US); Ronghua Zhang, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 615 days.

(21) Appl. No.: 15/665,135

(22) Filed: Jul. 31, 2017

(65) Prior Publication Data

US 2019/0036819 A1 Jan. 31, 2019

(51) Int. Cl.
*H04L 12/741* (2013.01)
*H04L 12/24* (2006.01)
(Continued)

(52) U.S. Cl.
CPC .......... *H04L 45/74* (2013.01); *G06F 9/45533* (2013.01); *H04L 12/46* (2013.01); *H04L 12/4633* (2013.01); *H04L 12/4641* (2013.01); *H04L 41/0893* (2013.01); *H04L 67/00* (2013.01); *H04L 67/1002* (2013.01);
(Continued)

(58) Field of Classification Search
CPC ... H04L 45/74; H04L 45/302; H04L 41/0893; H04L 41/5058; G06F 2009/4557
See application file for complete search history.

(56) References Cited

U.S. PATENT DOCUMENTS 5,204,966 A 4/1993 Wittenberg et al.
5,900,025 A 5/1999 Sollars
(Continued)

FOREIGN PATENT DOCUMENTS

CN 101641912 A 2/2010
CN 103181131 A 6/2013
(Continued)

OTHER PUBLICATIONS

NPL Author Unknown, "Enabling Service Chaining on Cisco Nexus 1000V Series," Month Unknown, 2012, 25 pages, CISCO.
(Continued)

*Primary Examiner* — Jeffrey M Rutkowski
*Assistant Examiner* — Jasper Kwoh
(74) *Attorney, Agent, or Firm* — Adeli LLP

(57) ABSTRACT

For a managed network, some embodiments provide a method for a set of service nodes in an active-active service node cluster in conjunction with a host computer hosting a destination data compute node (DCN) to improve the efficiency of directing a return data message to a service node storing state information for the flow to which the data message belongs. A primary service node in some embodiments receives a data message in a particular data message flow addressed to a destination DCN, performs a service on the data message and forwards the data message, along with information identifying the primary service node, to a host computer on which the destination DCN executes. The host computer generates an entry in a reverse forwarding table including identifying information for the particular data message flow and the primary service node to use to forward data messages in the particular data message flow to the primary service node.

20 Claims, 9 Drawing Sheets

(51) Int. Cl.
| | | |
|---|---|---|
| *H04L 29/08* | (2006.01) | |
| *H04L 29/06* | (2006.01) | |
| *H04L 12/46* | (2006.01) | |
| *G06F 9/455* | (2018.01) | |
| *H04L 12/725* | (2013.01) | |
| *H04L 45/74* | (2022.01) | |
| *H04L 41/0893* | (2022.01) | |
| *H04L 67/142* | (2022.01) | |
| *H04L 69/22* | (2022.01) | |
| *H04L 67/1001* | (2022.01) | |
| *H04L 67/00* | (2022.01) | |
| *H04L 41/50* | (2022.01) | |
| *H04L 45/302* | (2022.01) | |

(52) U.S. Cl.
CPC ............ *H04L 67/142* (2013.01); *H04L 69/22* (2013.01); *G06F 2009/4557* (2013.01); *H04L 41/5058* (2013.01); *H04L 45/302* (2013.01)

(56) References Cited

U.S. PATENT DOCUMENTS

| | | | |
|---|---|---|---|
| 6,108,308 | A | 8/2000 | Flavin et al. |
| 6,687,245 | B2 | 2/2004 | Fangman et al. |
| 7,120,693 | B2 | 10/2006 | Chang et al. |
| 7,146,421 | B2 | 12/2006 | Syvanne |
| 7,277,401 | B2 | 10/2007 | Kyperountas et al. |
| 7,561,515 | B2 | 7/2009 | Ross |
| 7,724,670 | B2 | 5/2010 | Nilakantan et al. |
| 7,760,640 | B2 | 7/2010 | Brown et al. |
| 7,765,312 | B2 | 7/2010 | Monette et al. |
| 7,778,194 | B1 | 8/2010 | Yung |
| 7,818,452 | B2 | 10/2010 | Matthews et al. |
| 7,826,390 | B2 | 11/2010 | Noel et al. |
| 7,881,215 | B1 | 2/2011 | Daigle et al. |
| 7,948,986 | B1 | 5/2011 | Ghosh et al. |
| 8,005,770 | B2 | 8/2011 | Minh et al. |
| 8,190,767 | B1 | 5/2012 | Maufer et al. |
| 8,261,317 | B2 * | 9/2012 | Litvin ................. H04L 63/0263 |
| | | | 370/230 |
| 8,300,532 | B1 | 10/2012 | Venkatramani et al. |
| 8,316,113 | B2 | 11/2012 | Linden et al. |
| 8,339,994 | B2 | 12/2012 | Gnanasekaran et al. |
| 8,369,323 | B1 | 2/2013 | Desai |
| 8,370,936 | B2 | 2/2013 | Zuk et al. |
| 8,553,552 | B2 | 10/2013 | Hu et al. |
| 8,625,426 | B2 | 1/2014 | Strulo et al. |
| 8,711,703 | B2 | 4/2014 | Allan et al. |
| 8,713,663 | B2 | 4/2014 | An |
| 8,737,221 | B1 | 5/2014 | Jilani et al. |
| 8,811,401 | B2 | 8/2014 | Stroud et al. |
| 8,830,834 | B2 | 9/2014 | Sharma et al. |
| 8,897,132 | B2 | 11/2014 | Feroz et al. |
| 8,937,865 | B1 | 1/2015 | Kumar et al. |
| 8,942,238 | B2 | 1/2015 | Kano et al. |
| 9,110,864 | B2 | 8/2015 | Jamjoom et al. |
| 9,137,052 | B2 | 9/2015 | Koponen et al. |
| 9,270,521 | B2 | 2/2016 | Tompkins |
| 9,282,027 | B1 | 3/2016 | Brandwine et al. |
| 9,317,469 | B2 | 4/2016 | Gross et al. |
| 9,349,135 | B2 | 5/2016 | Sarshar |
| 9,374,337 | B2 | 6/2016 | Rangaraman et al. |
| 9,391,859 | B2 | 7/2016 | Huang et al. |
| 9,450,862 | B2 | 9/2016 | Chen et al. |
| 9,497,281 | B2 | 11/2016 | Jagadish et al. |
| 9,825,810 | B2 | 11/2017 | Jain et al. |
| 9,866,473 | B2 | 1/2018 | Parsa et al. |
| 9,876,714 | B2 | 1/2018 | Parsa et al. |
| 10,390,290 | B1 | 8/2019 | Zhang et al. |
| 2003/0093481 | A1 | 5/2003 | Mitchell et al. |
| 2003/0154399 | A1 | 8/2003 | Zuk et al. |
| 2004/0018839 | A1 | 1/2004 | Andric et al. |
| 2004/0197079 | A1 | 10/2004 | Latvala et al. |
| 2005/0063324 | A1 | 3/2005 | O'Neill et al. |
| 2005/0220098 | A1 | 10/2005 | Oguchi et al. |
| 2006/0176882 | A1 | 8/2006 | Schein et al. |
| 2006/0193247 | A1 | 8/2006 | Naseh et al. |
| 2006/0193252 | A1 | 8/2006 | Naseh et al. |
| 2007/0061492 | A1 | 3/2007 | van Riel |
| 2007/0180226 | A1 * | 8/2007 | Schory ............. H04L 29/12481 |
| | | | 713/153 |
| 2007/0201357 | A1 | 8/2007 | Smethurst et al. |
| 2008/0072305 | A1 | 3/2008 | Casado et al. |
| 2008/0098113 | A1 | 4/2008 | Hansen et al. |
| 2008/0259938 | A1 | 10/2008 | Keene et al. |
| 2009/0016354 | A1 | 1/2009 | Isobe |
| 2009/0097406 | A1 | 4/2009 | Nilakantan et al. |
| 2009/0129271 | A1 | 5/2009 | Ramankutty et al. |
| 2009/0193122 | A1 | 7/2009 | Krishamurthy |
| 2009/0199268 | A1 | 8/2009 | Ahmavaara et al. |
| 2009/0235325 | A1 | 9/2009 | Dimitrakos et al. |
| 2010/0046530 | A1 | 2/2010 | Hautakorpi et al. |
| 2010/0097931 | A1 | 4/2010 | Mustafa |
| 2010/0100616 | A1 | 4/2010 | Bryson et al. |
| 2010/0271964 | A1 | 10/2010 | Akhter et al. |
| 2010/0302940 | A1 | 12/2010 | Patel et al. |
| 2011/0013639 | A1 | 1/2011 | Matthews et al. |
| 2011/0026537 | A1 | 2/2011 | Kolhi et al. |
| 2011/0213888 | A1 | 9/2011 | Goldman et al. |
| 2012/0106560 | A1 | 5/2012 | Gumaste |
| 2012/0131216 | A1 | 5/2012 | Jain et al. |
| 2012/0216282 | A1 | 8/2012 | Pappu et al. |
| 2012/0250682 | A1 | 10/2012 | Vincent et al. |
| 2012/0258712 | A1 | 10/2012 | Rozinov |
| 2013/0007740 | A1 | 1/2013 | Kikuchi et al. |
| 2013/0073743 | A1 | 3/2013 | Ramasamy et al. |
| 2013/0121209 | A1 | 5/2013 | Padmanabhan et al. |
| 2013/0155902 | A1 | 6/2013 | Feng et al. |
| 2013/0163594 | A1 | 6/2013 | Sharma et al. |
| 2013/0174177 | A1 | 7/2013 | Newton et al. |
| 2013/0201989 | A1 | 8/2013 | Hu et al. |
| 2013/0227550 | A1 | 8/2013 | Weinstein et al. |
| 2013/0239198 | A1 | 9/2013 | Niemi |
| 2013/0254085 | A1 | 9/2013 | Tanimoto et al. |
| 2013/0329584 | A1 | 12/2013 | Ghose et al. |
| 2013/0332983 | A1 * | 12/2013 | Koorevaar ............. H04L 63/20 |
| | | | 726/1 |
| 2013/0336337 | A1 | 12/2013 | Gopinath et al. |
| 2014/0050091 | A1 | 2/2014 | Biswas et al. |
| 2014/0068602 | A1 | 3/2014 | Gember et al. |
| 2014/0092906 | A1 | 4/2014 | Kandawamy et al. |
| 2014/0115578 | A1 | 4/2014 | Cooper et al. |
| 2014/0195666 | A1 | 7/2014 | Dumitriu et al. |
| 2014/0198649 | A1 | 7/2014 | Jain et al. |
| 2014/0269733 | A1 | 9/2014 | Venkatesh |
| 2014/0297964 | A1 | 10/2014 | Nakase |
| 2014/0301388 | A1 | 10/2014 | Jagadish et al. |
| 2014/0304399 | A1 | 10/2014 | Chaudhary et al. |
| 2014/0310418 | A1 | 10/2014 | Christopher et al. |
| 2014/0323127 | A1 | 10/2014 | Evans et al. |
| 2014/0380087 | A1 | 12/2014 | Jamjoom et al. |
| 2015/0106420 | A1 | 4/2015 | Warfield et al. |
| 2015/0146539 | A1 | 5/2015 | Mehta et al. |
| 2015/0263899 | A1 | 9/2015 | Tubaltsev et al. |
| 2015/0312155 | A1 | 10/2015 | Anand et al. |
| 2016/0006654 | A1 * | 1/2016 | Fernando ................ H04L 45/74 |
| | | | 370/392 |
| 2016/0028630 | A1 | 1/2016 | Wells |
| 2016/0028855 | A1 | 1/2016 | Goyal et al. |
| 2016/0043901 | A1 | 2/2016 | Sankar et al. |
| 2016/0065479 | A1 | 3/2016 | Harper et al. |
| 2016/0080261 | A1 * | 3/2016 | Koponen ................ H04L 45/74 |
| | | | 370/392 |
| 2016/0119236 | A1 | 4/2016 | DeCusatis et al. |
| 2016/0142295 | A1 | 5/2016 | Parsa et al. |
| 2016/0142296 | A1 | 5/2016 | Parsa et al. |
| 2016/0142297 | A1 | 5/2016 | Parsa et al. |
| 2016/0142314 | A1 | 5/2016 | Parsa et al. |
| 2016/0226700 | A1 | 8/2016 | Zhang et al. |
| 2016/0241669 | A1 | 8/2016 | Royon et al. |
| 2016/0308770 | A1 * | 10/2016 | Zhang ..................... H04L 12/10 |
| 2016/0315814 | A1 | 10/2016 | Thirumurthi et al. |
| 2017/0048136 | A1 | 2/2017 | Williams |

(56) References Cited

U.S. PATENT DOCUMENTS

| | | | |
|---|---|---|---|
| 2017/0085486 A1 | 3/2017 | Chung et al. | |
| 2017/0150418 A1 | 5/2017 | Kim et al. | |
| 2017/0195169 A1* | 7/2017 | Mills | H04L 41/0677 |
| 2017/0257801 A1 | 9/2017 | Toth et al. | |
| 2018/0248805 A1 | 8/2018 | Kamat et al. | |
| 2018/0278541 A1* | 9/2018 | Wu | H04W 24/08 |
| 2019/0021029 A1 | 1/2019 | Rydnell et al. | |

FOREIGN PATENT DOCUMENTS

| | | |
|---|---|---|
| CN | 103647656 A | 3/2014 |
| CN | 103701900 A | 4/2014 |
| CN | 103930882 B | 7/2014 |
| CN | 104022891 A | 9/2014 |
| EP | 1890438 | 2/2008 |
| WO | 2008095010 | 8/2008 |
| WO | 2016076900 | 5/2016 |

OTHER PUBLICATIONS

NPL Aversa, Luis, et al., "Load Balancing a Cluster of Web Servers Using Distributed Packet Rewriting," Computer Science Department Technical Report, Jan. 6, 1999, 13 pages, Boston University, Boston, MA, USA.

NPL Dixon, Colin, et al., "An End to the Middle," Proceedings of the 12th conference on Hot topics in operating systems USENIX Association, May 2009, 5 pages, Berkeley, CA, USA.

NPL Guichard, J., et al., "Network Service Chaining Problem Statement," Network Working Group, Jun. 13, 2013, 14 pages, Cisco Systems, Inc.

NPL Joseph, Dilip, et al., "A Policy-aware Switching Layer for Date Centers," Jun. 24, 2008, 26 pages, Electrical Engineering and Computer Sciences, University of California, Berkeley, CA, USA.

NPL Koponen, Teemu, et al., "Network Virtualization in Multi-tenant Datacenters," Aug. 2013, 22 pages, VMware, Inc., Palo Alto, California, USA.

NPL Schroeder, Trevor, et al., "Scalable Web Server Clustering Technologies," IEEE Network, vol. 14, No. 3, May 1, 2000, 8 pages, IEEE Service Center, New York, NY, USA.

NPL Sekar, Vyas, et al., "Design and Implementation of a Consolidated Middlebox Architecture," 9th USENIX conference on Networked System Design and Implementation, Apr. 25-27, 2012, 14 pages.

NPL Sherry, Justine, et al., "Making Middleboxes Someone Else's Problem: Network Processing as a Cloud Service," SSIGCOMM, Aug. 13-17, 2012, 12 pages, ACM, Helsinki, Finland.

Harper, Matthew H., et al., (U.S. Appl. No. 62/042,049), filed Aug. 26, 2014, 27 pages.

* cited by examiner

Forwarding Table 300

| Flow 1: {SrcIP1; SrcMAC1; DestIP1; DestMAC1; Protocol1} | Primary SN: IP2, MAC2 | Secondary SN: IP3, MAC3 | Tertiary SN: IP5, MAC5 |
|---|---|---|---|
| Flow 2: {SrcIP12; SrcMAC2; DestIP2; DestMAC2; Protocol2} | Primary SN: IP3, MAC3 | Secondary SN: IP4, MAC4 | |
| ⋮ | ⋮ | ⋮ | ⋮ |
| Flow n: {SrcIPn; SrcMACn; DestIPn; DestMACn; Protocoln} | Primary SN: IP2, MAC2 | Secondary SN: IP5, MAC5 | |

Forwarding Table Entries 301

USE OF HYPERVISOR FOR ACTIVE-ACTIVE STATEFUL NETWORK SERVICE CLUSTER

BACKGROUND

Stateful network services such as firewalls, load balancers, secure sockets layer (SSL) virtual private network (VPN) devices, and network address translation (NAT) devices are an essential part of any enterprise network. Stateful network services often perform deep packet processing such as SSL or TCP termination and content inspection making them significantly more CPU-intensive than software-based switches and routers. As a result, stateful network services often become the bottleneck in networks making it all the more critical to scale them as the organization needs grow.

Primarily, there are two approaches to scaling stateful network services: vertical scaling (scale-up) and horizontal scaling (scale-out). Vertical scaling, replacing the existing device with a bigger and more powerful device, is an easier solution to implement and maintain, but is often very expensive. Horizontal scaling, also referred to as active-active clustering, offers a way to build capacity gradually as demand increases, by adding more devices to the installation, but is more complex to implement and maintain. Often, primarily due to the upfront investment associated with vertical scaling, active-active clustering is preferred.

Further, in case of stateful network services in virtual-form factor (e.g., virtual network function (VNF)), vertical scaling is limited by the CPU capacity available in the physical server hosting the network service. As a result, active-active clustering is the only viable solution to scale such services.

Active-active clustering consists of a group of nodes (devices) acting in unison to meet the performance and scaling requirements. So, one of the key challenges in active-active clustering is to divide the traffic among all the nodes of the cluster. In addition, both the forward flow (incoming) and the reverse flow (outgoing) of the same session must be sent to the same node of the cluster for proper processing by the stateful network services.

In one solution, a specific node of the cluster is chosen from the cluster (typically by performing consistent hashing) for each session and both forward and reverse flow data messages are redirected to that node from the nodes receiving traffic from the routers. One of the main challenges with this solution is that traffic redirection significantly lowers the performance and scalability of the solution. As a router ECMP hash is different from the consistent hash performed by a cluster node, most of the traffic will end up being redirected. Specifically, if there are N nodes in the cluster, then the probability that a packet received from the router will be redirected to another node for actual processing is (N-1)/N. So, even for a cluster of 8 nodes, almost 90% of the traffic will be redirected to another node. Since both forward and reverse traffic needs to be redirected, effective throughput is thus reduced. Redirecting so much traffic will also have significant impact on the CPU.

An ECMP-based alternative to the above methods is desired that allows for active-clustering and that minimizes, and in some cases completely eliminates, traffic redirection for virtualized environments.

BRIEF SUMMARY

For a managed network, some embodiments provide a method for a set of service nodes in an active-active service node cluster in conjunction with a host computer hosting a destination data compute node (DCN) to improve the efficiency of directing a reverse-flow data message to a service node storing state information for the flow to which the data message belongs.

In some embodiments, a primary service node receives a data message in a particular data message flow addressed to a destination DCN, performs a service on the data message and forwards the data message, along with information identifying the primary service node, to a host computer on which the destination DCN executes for the host to use to forward return data messages to the primary service node. In some embodiments, the primary service node maintains session state information for the particular data message flow. Session state information in some embodiments is used in performing the service on the data messages in the particular data message flow and includes, for example, a connection state of the data message flow.

A primary service node in some embodiments identifies a secondary service node for the particular data message flow and sends the session state information to the secondary service node. The secondary service node uses the state information to take over data message processing without interrupting the data message flow when a primary service node becomes unavailable. In some embodiments, identifying the secondary service node comprises computing a consistent hash of at least one value in the header field of data messages in the particular data message flow to identify the secondary service node. In some embodiments, the identification is also based on a service cluster membership.

Forwarding messages to the host machine in some embodiments is done by encapsulating the data message for delivery to a tunnel endpoint executing on the host computer. In some embodiments, the information identifying the primary service node is included in an outer header of the encapsulated data message. Information identifying the secondary service node is also forwarded with the data message to the host computer on which the destination compute node executes for the host to use to forward return data messages to the secondary service node in some embodiments. As for the information identifying the primary service node, in some embodiments, the information identifying the secondary service node is also included in an outer header of the encapsulated data message.

In some embodiments, the host computer generates an entry in a reverse forwarding table including identifying information for the particular data message flow and the primary and secondary service nodes to use to forward data messages in the particular data message flow to the primary service node, or if the primary service node is unavailable, to the secondary service node. In some embodiments, a hypervisor executing on the host computer intercepts return data messages from the destination DCN and uses the entry for the particular data message flow in the reverse forwarding table to forward the data message to the primary or secondary service node.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
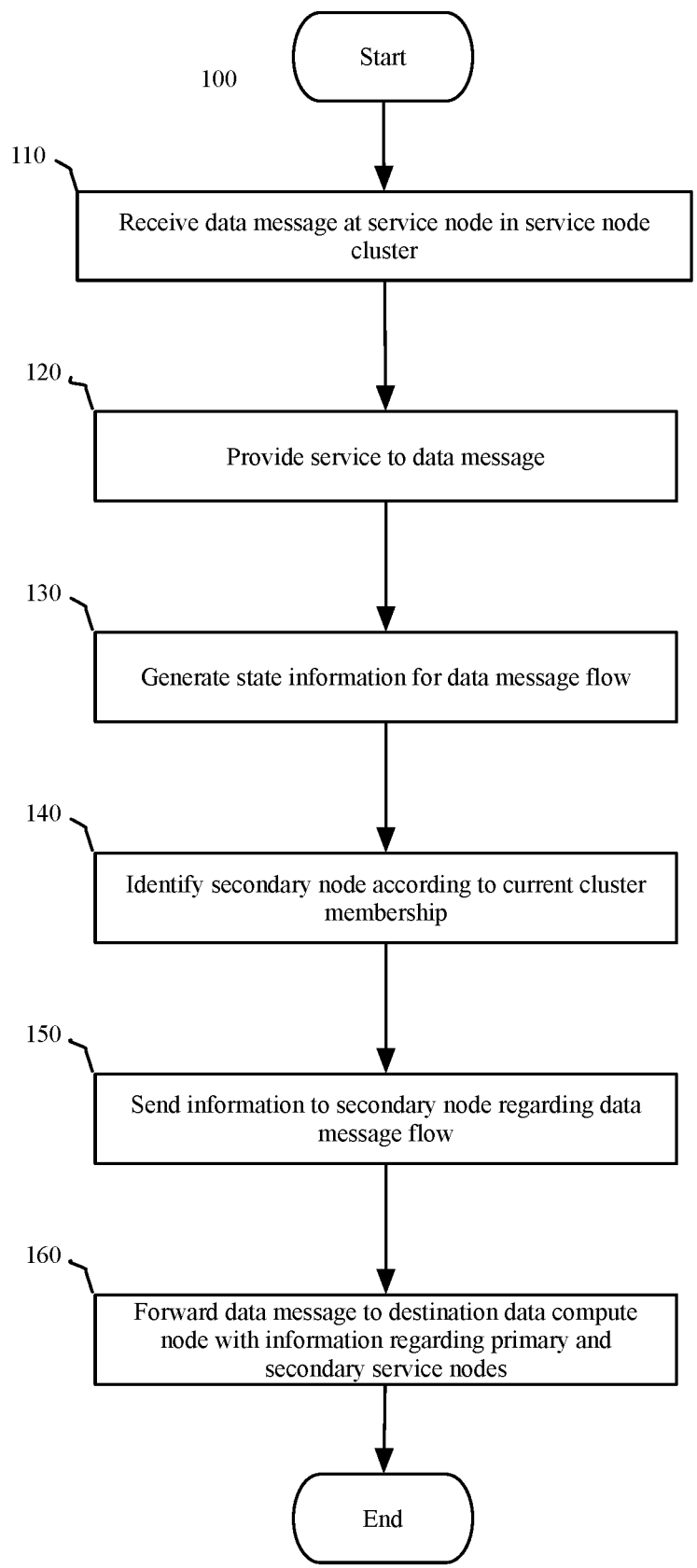
FIG. 1 conceptually illustrates a process of some embodiments for identifying a primary service node to a host computer hosting a destination DCN.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

For a managed network, some embodiments provide a method for a set of service nodes in an active-active service node cluster, in conjunction with a host computer to improve the efficiency of directing a reverse-flow data message to a service node storing state information for the flow to which the data message belongs. In some embodiments, a primary service node receives a data message in a particular data message flow addressed to a destination data compute node (DCN), performs a service on the data message and forwards the data message, along with information identifying the primary service node, to a host computer on which the destination DCN executes for the host to use to forward return data messages to the primary service node. In some embodiments, the primary service node maintains session state information for the particular data message flow. Session state information in some embodiments is used in performing the service on the data messages in the particular data message flow and includes, for example, a connection state of the data message flow.

As used in this document, the term data message, message, data packet, or packet refers to a collection of bits in a particular format sent across a network. It should be understood that the term data message, message, data packet, or packet may be used herein to refer to various formatted collections of bits that may be sent across a network, such as Ethernet frames, IP packets, TCP segments, UDP datagrams, etc. While the examples below refer to data messages, messages, data packets, or packets, it should be understood that the invention should not be limited to any specific format or type of data message. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Some embodiments make use of an overlay network. An overlay network may refer to a logical L2 or L3 network that is implemented using an underlying physical network. An overlay network includes in some embodiments a set of host computers hosting DCNs of the overlay network along with a set of managed physical forwarding elements (MPFEs or MFEs) (e.g., switches, routers, bridges, etc.). The MFEs implement logical forwarding elements (LFEs) (e.g., logical switches, logical routers, logical bridges, etc.) that make up the logical L2 or L3 networks. MFEs may logically process data messages for a particular LFE or set of LFEs in a logical network and use the underlying physical network to deliver the data message to a destination DCN in the overlay network or that exists outside the overlay network. An overlay network may be implemented using tunnels between host computers (e.g., using virtual extensible local area network (VXLAN) tunnel endpoints (VTEPs) executing on the host computers). In using tunnels, host computers in some embodiments encapsulate data messages so that they are addressed to the tunnel endpoint of the host computer hosting the destination DCN, which then decapsulates the data message and delivers it to the destination DCN.

FIG. 1 illustrates process 100 of some embodiments for identifying a primary service node to a host computer hosting a destination DCN. Process 100 in some embodiments is carried out by a service node. In some embodiments, the service node is part of a service node cluster that is configured in an active-active configuration in which each of multiple service nodes provides a service to a set of data message flows. Process 100 begins (at 110) by receiving a data message in a data message flow. In some embodiments, the data message originates from a client compute node and is received through a forwarding element (e.g., a switch or router) that performs equal-cost multipath (ECMP) routing a load balancing operation, or similar type of operation, to determine the service node to which it sends the data message. Some steps of process 100 in some embodiments are performed only for a first data message received for the data message flow at the particular service node.

The process provides (at 120) the service provided by the service node cluster to the data message (e.g., a firewall, a load balancer, a secure sockets layer (SSL) virtual private network (VPN) service, network address translation (NAT), etc.) and generates (at 130) state information for the data message flow to which the received data message belongs. In some embodiments, the state information is not generated for each data message received but is generated for a first data message in a data message flow or when state information changes based on the received data message. State information for some data message flows (e.g., a layer 4 load balancing state indicating the backend server for the data message flow) does not change or only changes infrequently after state information is initially generated (referred to as per-flow or per-session state information). For other data message flows, state information may change with each received data message or packet (referred to as per-packet state information).

The process then identifies (at 140) a secondary service node according to a current service node cluster membership. In some embodiments, the secondary service node is identified by a consistent hash of attributes of the data message (e.g., a set of header field values) used by each service node in the service node cluster that associates a hash result with a specific service node in the service node cluster to identify a secondary service node. The secondary service node is used in some embodiments as a backup service node when a primary service node is not available or cannot be identified.

If the node identified (at 140) is the primary service node, a next node in the service cluster is designated as the secondary service node. A next node in some embodiments, is defined based on an ordering of a current cluster membership and may be either an immediately previous or immediately subsequent service node depending on the primary service node's position in the ordered list of service nodes (e.g., previous for odd-numbered service nodes and subsequent for even-numbered service nodes). A data message directed to a different service node identifies the primary service node as the secondary using the consistent hash when it is available, and a host computer identifies the secondary service node based on a forwarding table, described below, when the primary service node is not available.

After identifying the secondary service node, the process sends (at 150) information to the identified secondary service node regarding the data message flow. For per-session state information, the information is the generated state information. For per-packet state information, in some embodiments instead of sending the state information after every received data message, the process sends redirect information indicating the primary service node. The state information in some embodiments is sent as an out-of-band control message, while in others it is sent in-band directly to the secondary service node. It is to be understood that for per-flow or per-session state information, the identification of the secondary service node and sending the state information to the secondary service node need not be performed for every received data message, but is performed at least when the state information changes. In some embodiments, for data messages that are identified as important or critical according to some set of criteria configured in the system or by a user, the process identifies a tertiary service node according to a second consistent hash of attributes of the data message that is also sent the state information and is identified in the forwarded data message.

The process then forwards (at 160) the serviced data message to the destination data compute node. As part of forwarding (at 160) the data message to the destination DCN, the process includes information regarding a primary and secondary (and tertiary) service node for the data message. In some embodiments, the primary service node is the node that provides the service and forwards the data message to the destination DCN and the secondary service node is the secondary service node identified at 140. The information regarding the primary and secondary service nodes in some embodiments is included as part of an encapsulation for an overlay network to deliver the data message to a tunnel endpoint executing on the host computer hosting the destination DCN. The encapsulation header in such embodiments contains the information identifying the primary and secondary service nodes.

The identification of the service nodes in some embodiments includes network layer (e.g., internet protocol (IP)) addresses, data link layer (e.g., media access control (MAC)) addresses, or both (e.g., IP and MAC addresses) for the specific service nodes instead of a virtual network layer address or data link layer address used to address the service node cluster generally. By identifying the specific service nodes, the process allows data messages in the data message flow to be returned to the specific service node that stores state information for the data message flow, instead of going through a load balancing operation on the return path based on the virtual IP address of the network service cluster that may or may not direct the return data message to a service node storing state information for the data message flow. It should be understood that sending information to the secondary node and forwarding the data message to the destination are independent and may be performed in any order.

Figures 2, 3:
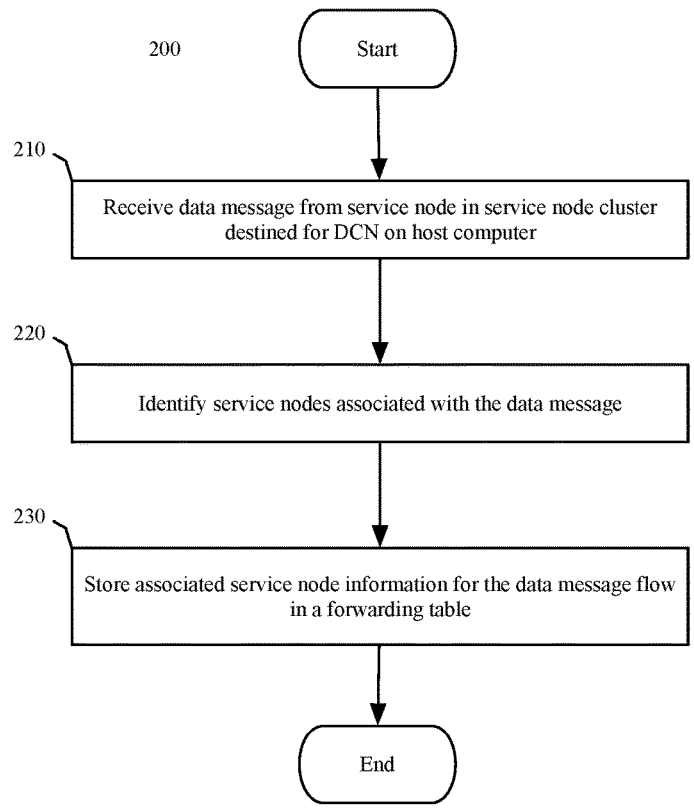
FIG. 2 conceptually illustrates a process of some embodiments for configuring a reverse forwarding table of a host computer hosting a destination DCN.
FIG. 3 conceptually illustrates a forwarding table associating data message flows with service nodes.

FIG. 2 conceptually illustrates a process 200 for configuring a forwarding table with information identifying a data message flow along with primary and secondary service nodes associated with the data message flow. In some embodiments, process 200 is carried out by a host computer hosting a destination DCN. A hypervisor of the host computer performs the process in some embodiments. Process 200 begins by receiving (at 210) a data message destined for a DCN executing on the host computer from a service node in a service node cluster. In some embodiments, the received data message is encapsulated for delivery to a tunnel endpoint (e.g., a virtual extensible local area network (VXLAN) tunnel endpoint (VTEP)) executing on the host computer.

The process then identifies (at 220) the service nodes associated with the data message (and data message flow). In some embodiments, identifying the service nodes associated with the data message includes examining the header used to tunnel the data message to the host computer (or the VTEP executing on the host computer) for the identifying information. The identification process distinguishes between a primary service node which is the preferred service node for a return data message and a secondary service node which is to be used if the primary service node is unavailable.

Once the primary and secondary service nodes have been identified, the process continues by storing (at 230) the association between the data message flow and the identified service nodes in a forwarding table (e.g., a reverse forwarding table). The forwarding table stores an identifier for the data message flow and identifiers for the service nodes that allow data messages to be directed to the particular service nodes instead of the service node cluster as a whole. An example of a forwarding table of some embodiments is provided in FIG. 3.

FIG. 3 illustrates a forwarding table with multiple forwarding table entries 301 for multiple data message flows (i.e., flows 1-N). Each forwarding table entry 301 of forwarding table 300 records an association between a particular data message flow and a particular set of service nodes (e.g., a primary, secondary, and optionally a tertiary service node). In FIG. 3, the flow identifier is a set of header field values of the data message flow (e.g., source IP, source MAC, destination IP, destination MAC, and protocol). In other embodiments, a different set of header field values or a hash of header field values is used to identify a data message flow. Each forwarding table entry in forwarding table 300 also includes an identification of the primary and secondary service nodes. In other embodiments, a forwarding table includes only a primary service node or includes an additional field for a tertiary service node as discussed above in relation to FIG. 1 and shown for the first forwarding table entry. FIG. 3 depicts the service node identification as an IP address and a MAC address as examples of network and data link layer addresses. One of ordinary skill in the art will recognize that any type of information identifying a specific service node could replace the IP and MAC addresses depicted in FIG. 3.

FIG. 3 also depicts that a single service node (e.g., the service node with IP2 and MAC 2) is a primary service node for multiple flows (e.g., flows 1 and N). FIG. 3 further depicts that a secondary node for a first flow (e.g., flow 1) is a primary node for another flow (e.g., flow 2). Each flow is independent and can be assigned any primary and secondary service nodes according to the operations that initially determine the primary and secondary service nodes. Forwarding table entries in forwarding table 300 in some embodiments are removed after a period of inactivity or when a session (i.e., data message flow) is terminated.

Figure 4:
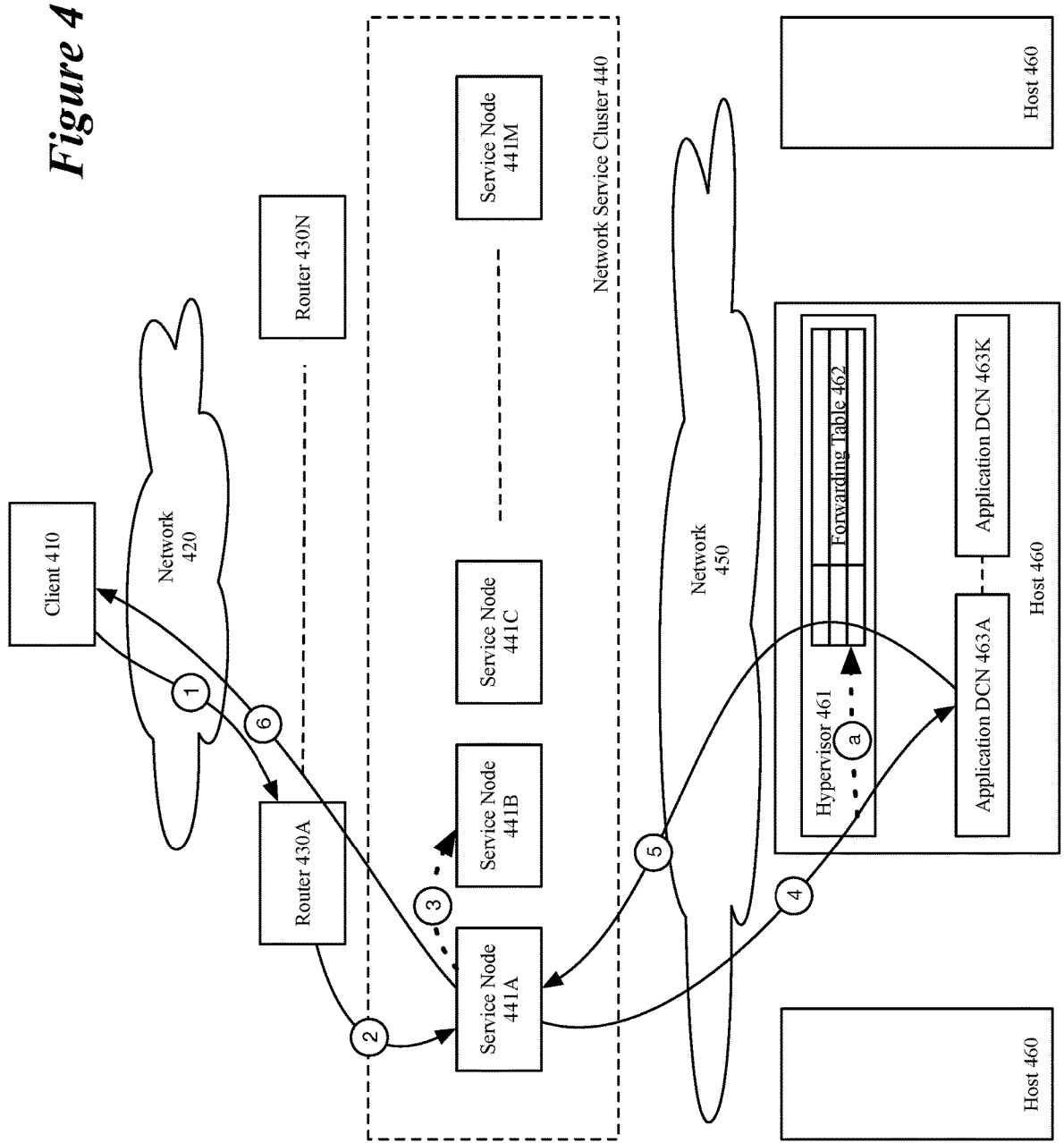
FIG. 4 conceptually illustrates a series of data messages exchanged for a data message flow requiring per-session state information originating at a client.

FIG. 4 depicts a series of data messages exchanged in one embodiment for a data message flow requiring per-session state information originating at a client. FIG. 4 depicts client 410 which is connected through network 420 to a set of routers 430. The set of routers 430 sits between the client and a set of service nodes 441A-M that make up network service cluster #140. Network service cluster 440 in some embodiments is addressable by a single network layer (e.g., IP) address (e.g., a virtual IP address) or otherwise appears as a single network appliance for providing a particular service.

FIG. 4 further illustrates network 450 that is placed between network service cluster 440 and a set of host computers 460 that host application DCNs that are the destination for data messages sent from the client 410. Network 450 in some embodiments is an underlay network over which an overlay network connecting DCNs is implemented. Multiple host computers 460 are depicted, but only one is shown with a representation of internal components, such as hypervisor 461, forwarding table 462, and application DCNs 463. It is understood that each host computer in some embodiments includes similar components as well as additional components and modules not shown here for clarity.

FIG. 4 depicts data message 1 being sent from a client compute node 410, ultimately to application DCN 463A, through network 420 and router 430A. Router 430A forwards the data message to service node 441A in network service cluster 440 based on the criteria applied by router 430A. As router 430A is not controlled by a tenant in some embodiments, the criteria for forwarding a data message to a particular service node in network service cluster 440 are not able to be determined a priori and any service node 441 may receive a particular data message. While the service node may not be determinable a priori, it is assumed that given a stable network service cluster membership, routers 430 will send data messages belonging to a same data message flow to a same service node.

Once the data message is received by service node 441A, as described above for process 100, service node 441A identifies a secondary service node and sends, as data message 3, the state information for the data message flow to which data message 1 belongs. In some embodiments, the secondary service node is a backup service node that can be identified (e.g., using a consistent hash) by any service node receiving subsequent data messages in the particular data message flow. For example, if the primary service node fails or a network service cluster membership changes and router 430 begins forwarding data messages in the particular flow to a different service node that does not maintain the state information for the data message flow, the service node receiving the data message (the new primary service node) can identify the secondary service node and forward the data message to the secondary service node. The secondary service node can then process the data message using the stored state information and send the state information to the new primary service node to be used to process future data messages for the particular flow. Additional details regarding the behavior of service nodes in the case of cluster membership changes are described in U.S. patent application Ser. No. 15/665,122, entitled "Methods for Active-Active Stateful Network Service Cluster," concurrently filed with this application and now issued as U.S. Pat. No. 10,951,584. This concurrently filed U.S. patent application Ser. No. 15/665,122, now issued as U.S. Pat. No. 10,951, 584, is incorporated herein by reference.

Data message 4 represents the encapsulated data message after the network service has been provided by service node 441A. As described above in relation to process 100, data message 4 includes information regarding the primary service node (e.g., 441A) and the secondary service node (e.g., 441B). Data message 4 is processed by the host computer (e.g., by hypervisor 461) to extract the primary and secondary service node information and populate forwarding table 462 as indicated by the arrow labeled 'a' and as described in relation to process 200. Application DCN 463A receives data message 4 and sends as a response data message 5.

Data message 5 in some embodiments is directed by DCN 463A to a network address for network service cluster 440, or client 410 instead of a specific network address for service node 441A. When host 460 processes the data message (e.g., in hypervisor 461) it performs a lookup in forwarding table 462 to determine whether the data message flow to which the data message belongs has an entry. In the embodiment shown in FIG. 4, the forwarding table would have an entry for data message 5's flow based on the previously received data message 4. In some embodiments, host 460 replaces the network address for network service cluster 440 with the network address specified in forwarding table 462 for primary service node 441A. In some embodiments, host 460 encapsulates data message 5 and uses the network address of primary service node 441A in the encapsulation header. The replaced or encapsulation network address avoids any load balancing or other distribution operations that may be performed as the data message traverses network 450 on the return path that could cause the data message to be forwarded to a service node not maintaining state information for the data message flow. After processing the return data message 5, service node 441A forwards the processed return data message 6 to client 410 through, e.g., router 430A.

Figure 5:
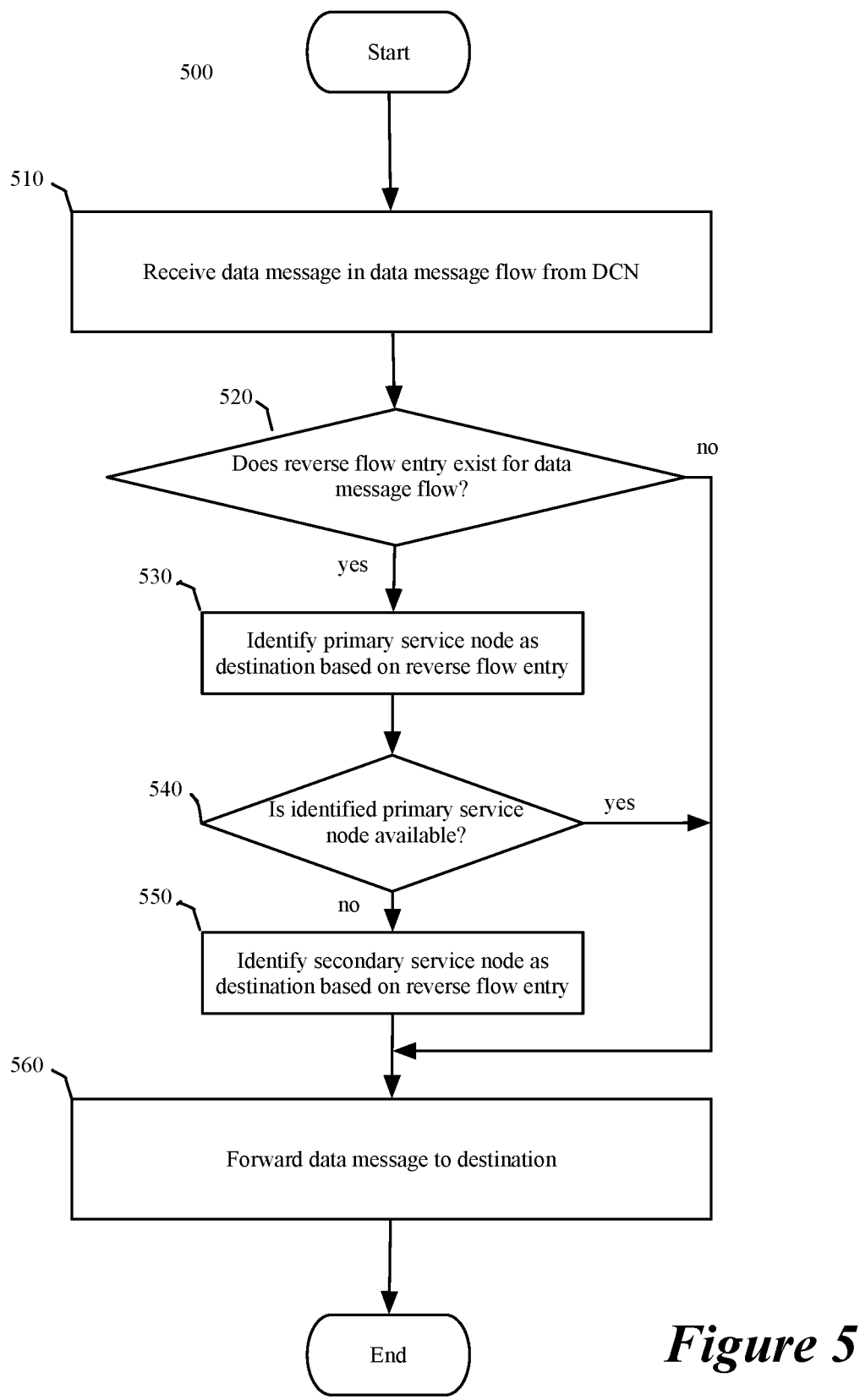
FIG. 5 conceptually illustrates a process of some embodiments for processing data messages received from a DCN on a host computer.

FIG. 5 conceptually illustrates a process 500 for processing data messages received from a DCN by a host computer hosting a DCN. For illustrative purposes, reference will be made to elements of FIG. 4. In some embodiments, process 500 is performed by a hypervisor (e.g., hypervisor 461) executing on the host computer. Process 500 begins by receiving (at 510) a data message from a DCN. In some embodiments receiving the data message is part of an interception process in a data message processing pipeline in the host computer. The process then determines (at 520) whether a reverse forwarding table entry exists in a forwarding table (e.g., forwarding table 462) that identifies primary and secondary service nodes. If the process determines (at 520) that no entry exists for the data message flow, the process forwards (at 560) the received data message to the destination and the process ends. In some embodiments, data messages for which no reverse forwarding table entry exists are addressed with an address (e.g., IP address or MAC address) of the network service cluster and will be forwarded to a particular service node in the network service cluster based on a load balancing operation by a forwarding element (e.g., a forwarding element in network 450 or a software switch or router executing on the host). The particular service node is often not the same service node that is selected by the routers (e.g., routers 430) for data messages in the data message flow traversing the network in the opposite direction because the different forwarding elements use different algorithms or processes for determining the service node in the network service cluster to which a data message is forwarded.

If the process determines (at 520) that a reverse forwarding table entry exists for the data message flow of the received data message, the process continues by identifying (at 530) the primary service node using the reverse forwarding table entry in the forwarding table. In some embodiments, a host (e.g., a hypervisor executing in the host) establishes a bidirectional forwarding detection (BFD) session, or some other failure detection session, with the primary service node to detect a failure of the primary service node or of the link between the host and the primary service node. Additionally, or alternatively, a management process in some embodiments informs host computers of network service cluster membership as cluster membership changes.

In some embodiments, once the process identifies (at 530) the primary service node, the process determines (at 540) whether the primary service node is available. A BFD session or some other failure detection protocol is used in some embodiments to determine that the primary service node is unavailable. If the process determines (at 540) that the primary service node is available, the process forwards the data message (at 560) to the destination (i.e., the primary service node) and the process ends.

If the process determines (at 540) that the primary service node is unavailable, based on, for example, a BFD session failing, the process identifies (at 550) the secondary service node for the data message flow in the reverse forwarding table entry. In the reverse forwarding table entry of the forwarding table, the primary and secondary service nodes in some embodiments are identified by a network address or a data link layer address, but one of ordinary skill in the art would understand that any unique identifier may be used to identify the primary and secondary nodes. Once the secondary node is identified, the process forwards (at 560) the data message to the destination (i.e., the secondary service node) and the process ends. In embodiments employing tertiary service nodes it is to be understood that when a secondary service node is determined to be unavailable, the tertiary service node identified in the reverse forwarding table entry is identified as the destination of the data message.

By identifying the secondary (and tertiary) service node in a forwarding table entry in addition to the primary service node, the host is able to send the return data message directly to the secondary (or tertiary) service node when a primary (and secondary) service node fails without requiring a service node in the network service cluster selected by a load balancing or other distribution algorithm to identify the secondary service node. In the case of a network service cluster providing a network address translation (NAT) service, this avoids having two secondary service nodes (one service node for each of the original and translated addresses) maintaining state information in addition to the primary service node.

Figure 6A:
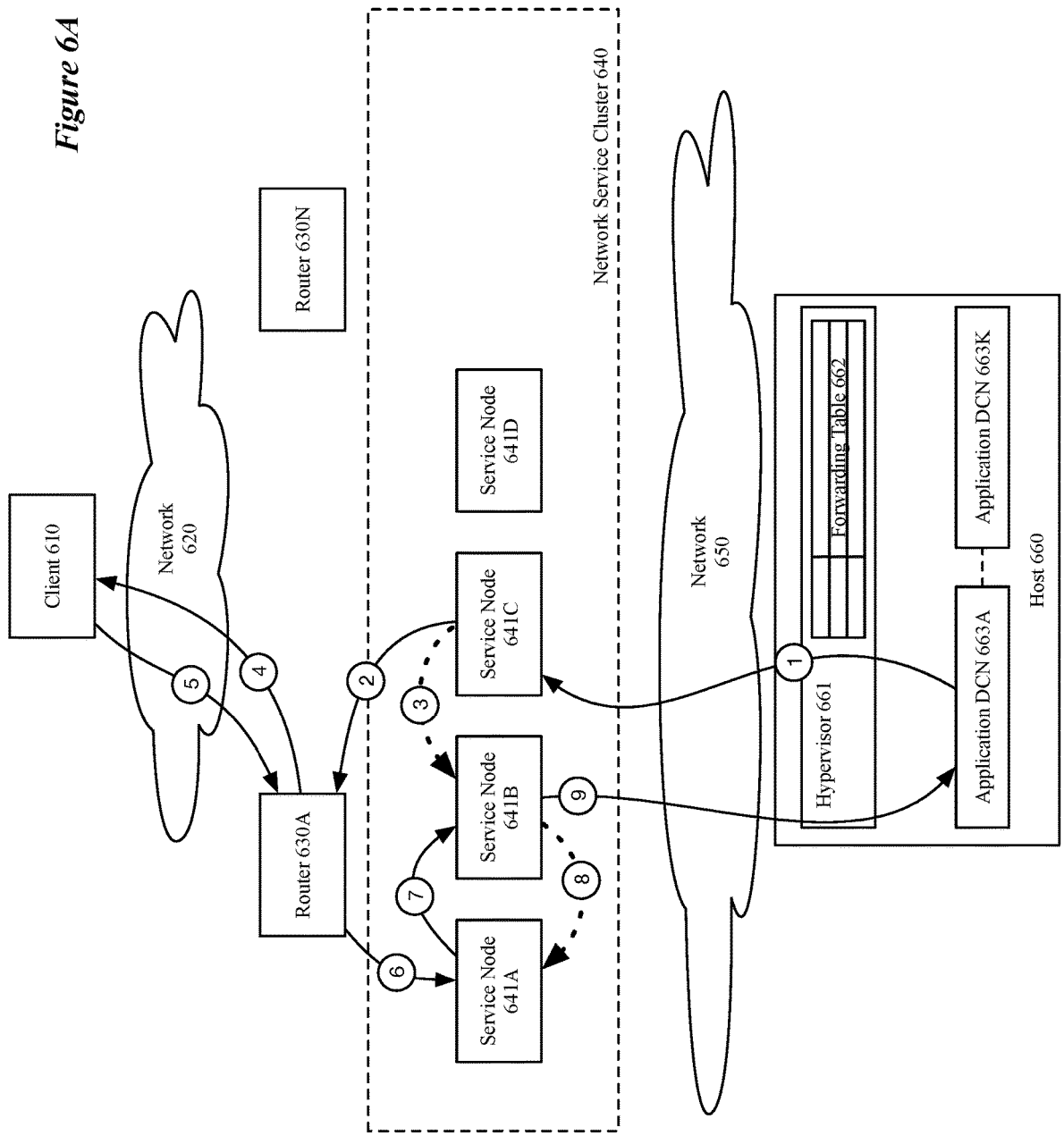
FIGS. 6A-B conceptually illustrate a series of data messages exchanged for a data message flow requiring per-session state information originating at an application DCN.
Figure 6B:
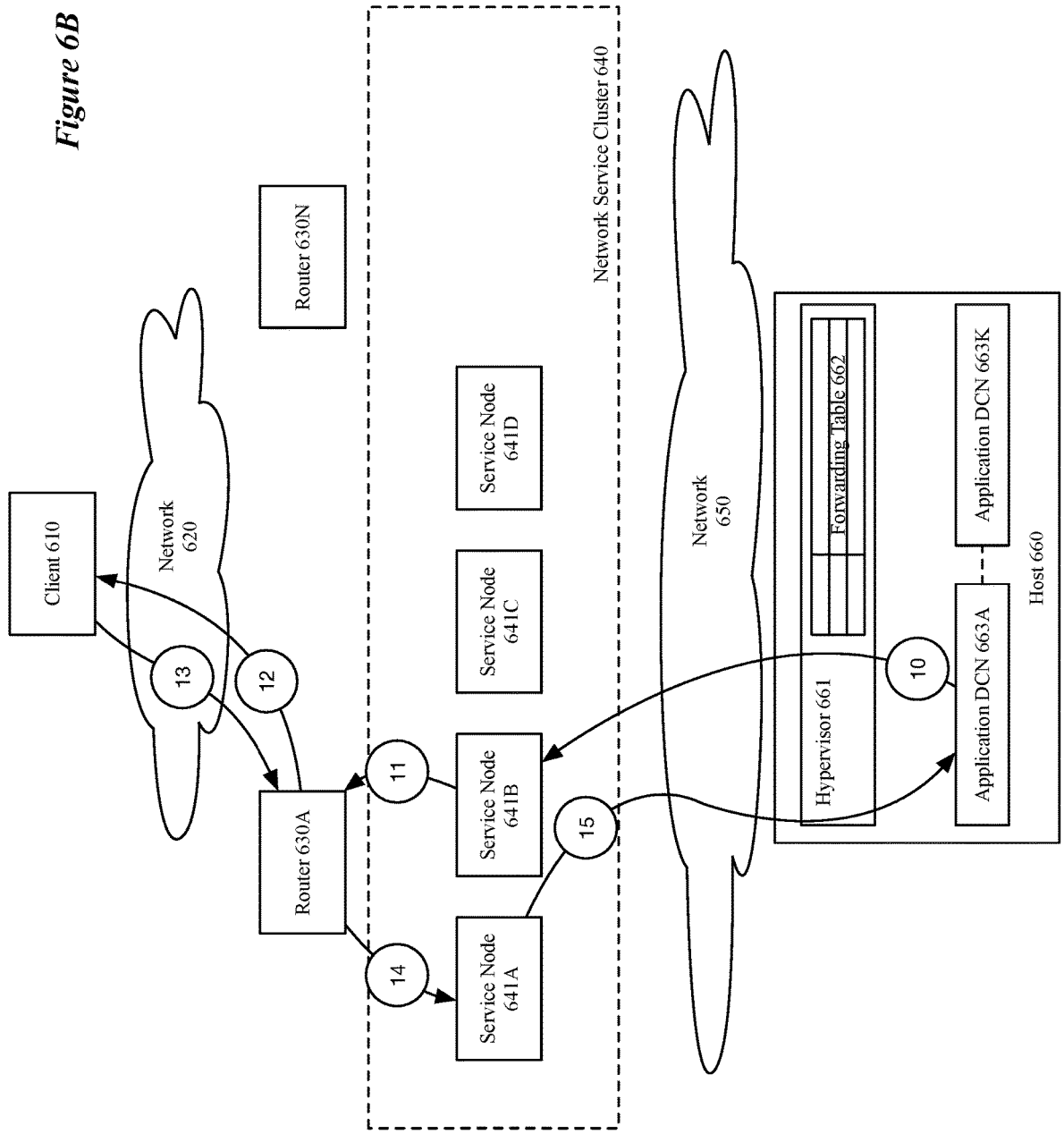

FIGS. 6A-B conceptually illustrates a series of data messages for a data message flow requiring per-session state information that originates at application DCN 663 on host 660. In FIG. 6A, Application DCN 663 sends data message with ultimate destination client 610. In the depicted example data message 1 is a first data message in a data message flow. Being the first data message for the data message flow, hypervisor 661 does not have a forwarding table entry stored in forwarding table 662 and forwards the data message to the destination without modifying the data message based on a forwarding table entry. The unmodified data message is forwarded over network 650 to network service cluster 640 and ultimately to service node 641C according to a load balancing or ECMP operation. After receiving the data message, service node 641C provides the network service provided by network service cluster 640 and sends data message 2 to a next hop router and ultimately to client 610. Service node 641C also generates state information for the data message flow, identifies a secondary service node based on a method common to all the service nodes (e.g., a consistent hash function) and sends state information, as data message 3, to the identified secondary service node as described above in relation to FIG. 1.

Client 610 sends return data message 5 through the network 620 and router 630A ultimately to application DCN 663. Router 630A performs a load balancing or ECMP operation and forwards data message 6 to service node 641A. Service node 641A, not having state information for the data message flow identifies service node 641B as the secondary node using the same method used by service node 641C above and forwards the data message to service node 641B as data message 7. Service node 641B receives data message 7 and responds to service node 641A with state information for the data message flow as data message 8. Service node 641B, having received the state information for the data message flow in data message 2, uses the state information to process data message 7 and forwards the processed data message as data message 9 to application DCN 663 over network 650 and through hypervisor 661. As described in relation to FIGS. 1 and 2, data message 9 is encapsulated with an encapsulation that identifies at least one service node associated with the data message flow. In the situation depicted in FIG. 6A, service node 641B only includes data associating itself with the data message flow to ensure that return data messages in the flow are processed without redirection, as service node 641B already has the state information. In other embodiments, service node 641B includes information indicating service node 641A as the primary service node and itself as the secondary service node. In such other embodiments, future data messages would resemble the data messages depicted in FIG. 4 with data message 3 being sent only when state information for the data message flow changes.

FIG. 6B depicts that, for the embodiment in which the secondary service node identifies only itself, a return data message from application DCN 663 is directed to and processed by service node 641B (i.e., the secondary service node). Data message 10 is sent from application DCN 663A and is processed by host 660. As described above in relation to FIG. 6A, the secondary service node has identified itself as the service node associated with the data message flow and forwarding table 662 stores this association and data message 10 is thus directed to service node 641B. Service node 641B processes data message 10 and forwards the processed data message as indicated by data message 11 to router 630 which then forwards the data message to client 610 as indicated by data message 12.

FIG. 6B further shows return data message 13 from client 610 being directed to router 630A which forwards the data message indicated by data message 14 to service node 641A as was data message 6 in FIG. 6A. Because service node 641A received state information for the data message flow in data message 8, it now processes data message 14 using the state information and forwards the processed data message as data message 15. In this embodiment, data message 15, being a first data message processed by service node 641A for this data message flow, includes information identifying service node 641A as the primary service node and service node 641B as the secondary service node. After data message 15 is processed by hypervisor 661, forwarding table 662 associates the data message flow with service node 641A as the primary service node and service node 641B as the secondary service node. Once forwarding table 662 is programmed with the identities of the primary and secondary service nodes, data messages in both directions will flow through service node 641A as depicted in FIG. 4 with data message 3 being sent only when state information changes.

Figure 7A:
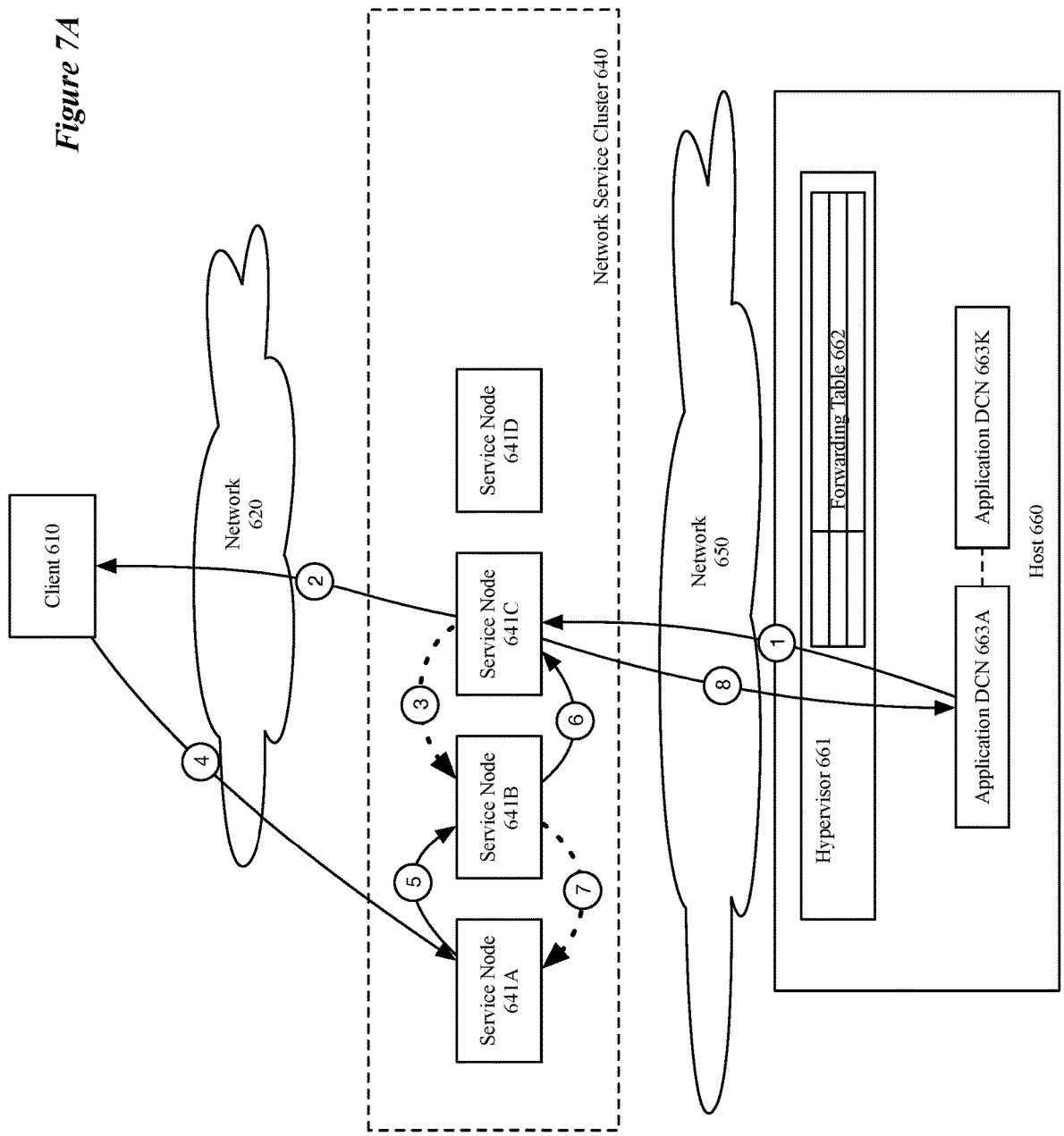
FIGS. 7A-B conceptually illustrate a flow of data messages for a data message flow requiring per-packet state information originating at an application DCN.
Figure 7B:
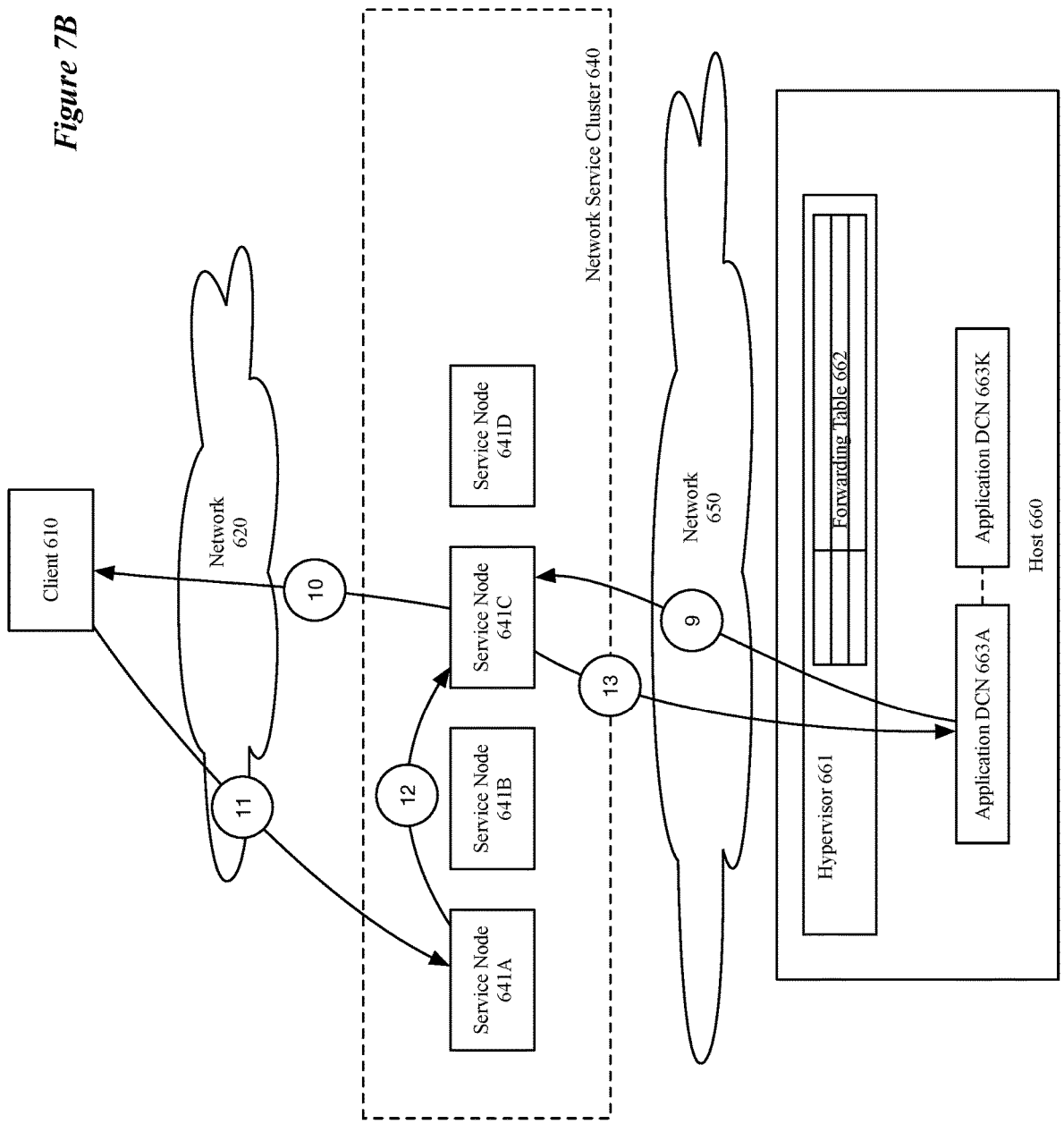

FIGS. 7A-B conceptually illustrate a series of data messages for a data message flow requiring per-packet state information originating at an application DCN in one embodiment. FIGS. 7A-B use the same reference numbers, but omits router 630.

Data message 1 is sent from application DCN 663A to service node 641C. Data message 1 represents a first data message in a data message flow for which a hypervisor does not have a forwarding table entry in a forwarding table. Data message 1 is therefore sent to service node 641C based on the load balancing or ECMP performed between application DCN 663A and network service cluster 640. Because the data message flow requires per-packet state information, service node 641C processes all data messages in the data message flow. Service node 641C then processes the data message and forwards it to client 610 as data message 2. As data message 3, service node 641C sends redirection information identifying that service node 641C is the primary service node to the secondary service node (e.g., service node 641B) identified as described above in relation to FIG. 1 to ensure that all future data messages are directed to service node 641C.

When client 610 sends, as data message 4, a return data message it is forwarded to service node 641A based on the load balancing or ECMP performed between client 610 and network service cluster 640. Service node 641A recognizing that it does not have state information for the data message flow identifies the secondary service node and forwards the data message to the secondary service node 641B as data message 5. Service node 641B determines that it has redirection information for the data message flow and redirects the data message to service node 641C as data message 6. After receiving the redirected data message, service node 641B sends, as data message 7, the redirection information for the data message flow to service node 641A in order to reduce the number of redirections necessary for a future data message to reach service node 641C.

Once the data message is received by service node 641C, it can process the return data message using the state information for the data message flow, and encapsulate it with information identifying itself as the primary service node as part of data message 8. The hypervisor 661 then populates its forwarding table with an entry indicating that service node 641C is the primary service node for the data message flow. Application DCN 663A sends data message 9 which is forwarded by hypervisor 661 directly to service node 641C based on the entry in the forwarding table for the data message flow. Service node 641C processes the data message and forwards it to client 610 as data message 10.

Data message 11 sent by client 610 is directed to service node 641A as before. However, as opposed to the situation after receiving data message 4, service node 641A now has redirection information for the data message flow and redirects the data message directly to service node 641C to process as data message 12. Finally, service node 641C processes the data message and forwards it to the application DCN 663A through hypervisor 661 as data message 13. Future data messages in the data message flow are similar to data messages 9-13 of FIG. 7. Using the hypervisor-based forwarding table in this embodiment reduces the use of redirection by requiring redirection only for data messages from a client to an application DCN, but not for data messages from the application DCN to the client.

Figure 8:
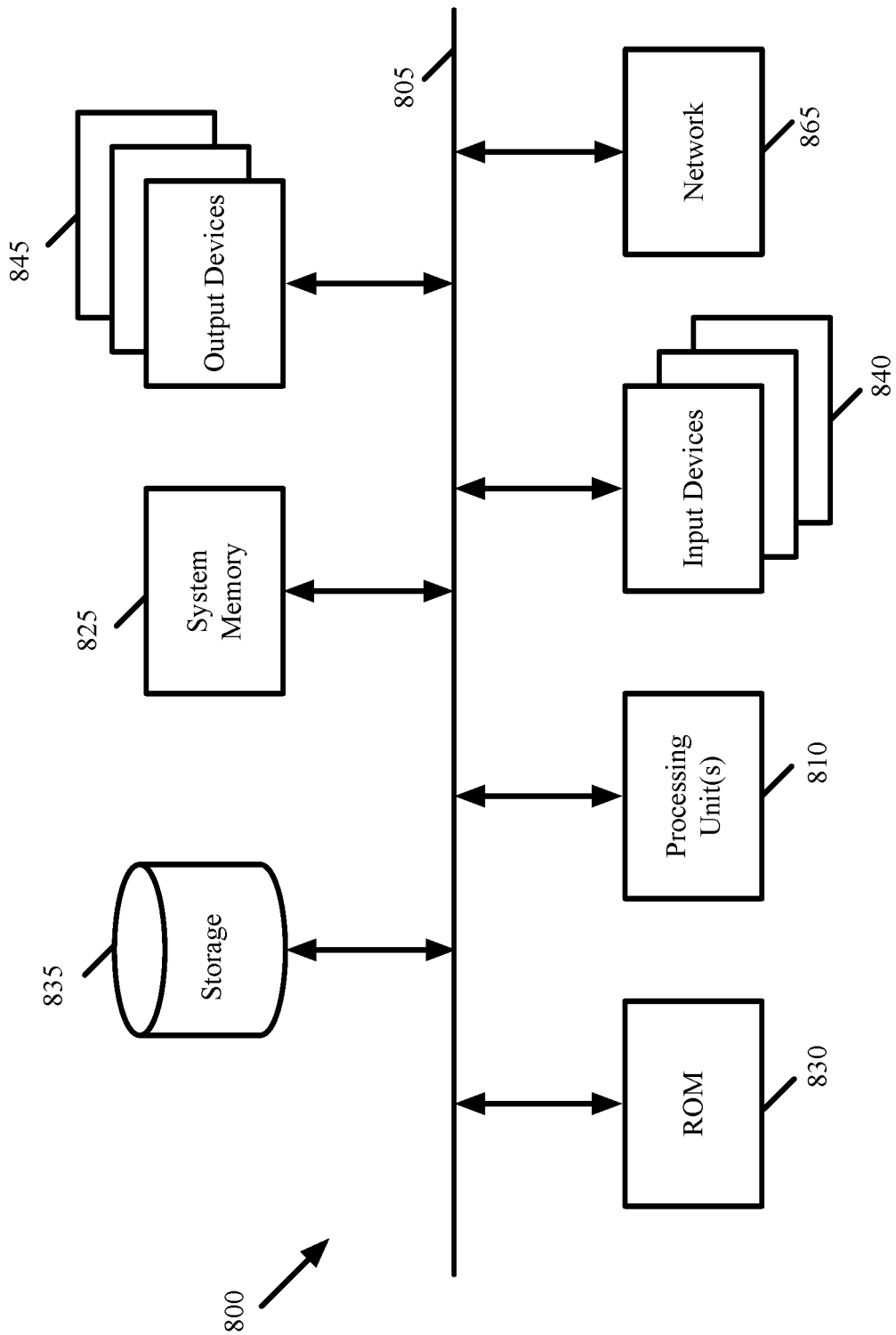
FIG. 8 conceptually illustrates an electronic system with which some embodiments of the invention are implemented.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such as random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host machine using resources of the host machine virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 1 and 2) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a cluster of service nodes that perform a service for different message flows, a method comprising:
    at a particular service node that is a primary service node for a particular data message flow that is addressed to a destination data compute node (DCN);
        receiving a data message of the particular data message flow from a forwarding element that performs a load balancing operation to select the particular service node;
        performing the service on the data message; and
        forwarding the data message along with information identifying the primary service node to a host computer on which the destination DCN executes, wherein a module executing on the host computer generates an entry in a reverse forwarding table including identifying information for (i) the particular data message flow and (ii) the primary service node, the generated reverse forwarding table entry used to forward, to the primary service node, a return data message of the particular data message flow that is identified on the host computer.

2. The method of claim 1, wherein forwarding the data message comprises encapsulating the data message for delivery to a tunnel endpoint executing on the host computer.

3. The method of claim 2, wherein the information identifying the primary service node is included in an outer header of the encapsulated data message.

4. The method of claim 1 further comprising maintaining session state information for the particular data message flow at the primary service node.

5. The method of claim 4 further comprising:
at the primary service node,
identifying a secondary service node for the particular data message flow; and
sending the session state information to the secondary service node.

6. The method of claim 5, wherein identifying a secondary service node comprises computing a consistent hash of at least one value in the header field of data messages in the particular data message flow to identify the secondary service node.

7. The method of claim 6, wherein the identification is also based on a service cluster membership.

8. The method of claim 7, wherein the received data message is a first data message in the particular data message flow and the service cluster membership is a current service cluster membership.

9. The method of claim 5, wherein information identifying the secondary service node is also forwarded with the data message to the host computer on which the destination DCN executes for the host to use to forward return data messages to the secondary service node if the primary service node is unavailable.

10. The method of claim 9, wherein the information identifying the primary service node and the information identifying the secondary service node are included in an outer header of the encapsulated data message.

11. The method of claim 1, wherein the load balancing operation is equal-cost multipath (ECMP) routing.

12. The method of claim 1, wherein none of the forwarding element, primary service node, and hypervisor execute on a same machine.

13. A non-transitory machine readable medium storing a program to be executed by a set of processing units of a particular service node that is a primary service node for a particular data message flow that is addressed to a destination data compute node (DCN), the particular service node in a cluster of service nodes that perform a service for different message flows, the program comprising sets of instructions for:

receiving a data message of the particular data message flow from a forwarding element that performs a load balancing operation to select the particular service node;
performing the service on the data message; and
forwarding the data message along with information identifying the primary service node to a host computer on which the destination DCN executes, wherein a module executing on the host computer generates an entry in a reverse forwarding table including identifying information for (i) the particular data message flow and (ii) the primary service node, the generated reverse forwarding table entry used to forward, to the primary service node, a return data message of the particular data message flow that is identified on the host computer.

14. The non-transitory machine readable medium of claim 13, wherein the set of instructions for forwarding the data message comprises a set of instructions for encapsulating the data message for delivery to a tunnel endpoint executing on the host computer.

15. The non-transitory machine readable medium of claim 14, wherein the information identifying the primary service node is included in an outer header of the encapsulated data message.

16. The non-transitory machine readable medium of claim 13 further comprising a set of instructions for maintaining session state information for the particular data message flow at the primary service node.

17. The non-transitory machine readable medium of claim 16 further comprising sets of instructions for:
identifying a secondary service node for the particular data message flow; and
sending the session state information to the secondary service node,
wherein the set of instructions for forwarding the data message further comprises a set of instructions for including information identifying the secondary service node for the host computer to use to forward return data messages to the secondary service node if the primary service node is unavailable.

18. The non-transitory machine readable medium of claim 17, wherein the set of instructions for identifying a secondary service node comprises a set of instructions for computing a consistent hash of at least one value in the header field of data messages in the particular data message flow to identify the secondary service node based on a service cluster membership.

19. The non-transitory machine readable medium of claim 13, wherein the load balancing operation is equal-cost multipath (ECMP) routing.

20. The non-transitory machine readable medium of claim 13, wherein none of the forwarding element, primary service node, and hypervisor execute on a same machine.

* * * * *